United States Patent
Zhang

(10) Patent No.: US 9,703,034 B2
(45) Date of Patent: Jul. 11, 2017

(54) LIGHT GUIDING PLATE, BACKLIGHT MODULE AND DISPLAY DEVICE

(71) Applicant: Wuhan China Star Optoelectronics Technology Co., Ltd., Wuhan, Hubei (CN)

(72) Inventor: Yanxue Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 90 days.

(21) Appl. No.: 14/758,231

(22) PCT Filed: May 21, 2015

(86) PCT No.: PCT/CN2015/079458
§ 371 (c)(1),
(2) Date: Jun. 27, 2015

(87) PCT Pub. No.: WO2016/173014
PCT Pub. Date: Nov. 3, 2016

(65) Prior Publication Data
US 2016/0320551 A1    Nov. 3, 2016

(30) Foreign Application Priority Data

Apr. 28, 2015 (CN) .......................... 2015 1 0214650

(51) Int. Cl.
*F21V 8/00* (2006.01)

(52) U.S. Cl.
CPC ........... *G02B 6/0088* (2013.01); *G02B 6/002* (2013.01); *G02B 6/009* (2013.01); *G02B 6/0055* (2013.01); *G02B 6/005* (2013.01)

(58) Field of Classification Search
CPC ..... G02B 6/0088; G02B 6/009; G02B 6/0055
See application file for complete search history.

(56) References Cited

U.S. PATENT DOCUMENTS

| | | | |
|---|---|---|---|
| 2007/0127261 A1* | 6/2007 | An ....................... | G02B 6/0016 362/608 |
| 2008/0049168 A1* | 2/2008 | Kubota ................ | G02B 6/0021 349/65 |
| 2012/0162569 A1* | 6/2012 | Sekiguchi ......... | G02F 1/133308 349/58 |
| 2012/0287355 A1* | 11/2012 | Oya ..................... | G02B 6/0031 348/790 |

* cited by examiner

*Primary Examiner* — Elmito Breval
(74) *Attorney, Agent, or Firm* — Andrew C. Cheng

(57) ABSTRACT

The disclosure provides a light guiding plate comprising a main body and an extending plate. The main body comprises an incident surface, an illuminating surface adjacent with the incident surface, and a bottom surface opposite to the illuminating surface. The extending plate extends from the incident surface toward the direction away from the main body. The disclosure also provides a backlight module and a display device.

11 Claims, 1 Drawing Sheet

LIGHT GUIDING PLATE, BACKLIGHT MODULE AND DISPLAY DEVICE

CROSS-REFERENCE TO RELATED APPLICATION

This application claims the benefit of, and priority to, Chinese Patent Application No. 201510214650.0, filed Apr. 28, 2015, titled "Light guiding plate, backlight module and display device", the entire contents of which are incorporated by reference herein in its entirety.

BACKGROUND

Technical Field

The disclosure is related to the field of liquid crystal display, and more particularly to a light guiding plate, a backlight module and a display device.

Related Art

Currently, liquid crystal display devices are widely used in display units of electronic devices. As the electronic devices become thinner and thinner, it is more and more important to improve the electronic devices. Backlight modules are important units in liquid crystal display devices, such that the performance of the backlight modules is more and more important.

In present technique, a backlight module comprises a frame, a light guiding plate surrounded by the frame, an optical film fixed on the light guiding plate and the frame by a light shielding tape, a backplate disposed at the peripheral edge of the frame, a LED light source and a light shielding tape. The light guiding plate is an important unit in the backlight module. However, part of the light emitted from the LED light source of the backlight module, which passes through the incident side and enters the light guiding plate, passes through the bottom of the LED source and does not enter the light guiding plate, such that the light is wasted, and the utilization percentage is lowered.

SUMMARY

The disclosure provides a light guiding plate, so as to avoid the waste of the light source and to solve the problem of light leakage of the bottom of the LED light source.

The disclosure also provides a backlight module and a display device.

The disclosure provides a light guiding plate comprising a main body and an extending plate. The main body comprises an incident surface, an illuminating surface adjacent with the incident surface, and a bottom surface opposite to the illuminating surface. The extending plate extends from the incident surface toward the direction away from the main body.

Wherein, the extending plate further comprises a supplementary light surface, the supplementary light surface is perpendicular to the incident surface, or an acute angle is inscribed by the supplementary light surface and the incident surface.

Wherein, the extending plate further comprises a bottom surface opposite to the supplementary light surface, the bottom surface of the extending plate and the bottom surface of the main body toward the same direction, the bottom surface of the extending plate and the bottom surface of the main body are disposed stepwisely, such that a concave portion is formed on the bottom of the light guiding plate.

The disclosure also provides a backlight module, the backlight module comprises a backplate, a frame, a light source, an optical film, and a light guiding plate. The frame, the light guiding plate, the light source and the optical film are disposed inside the backplate, and the optical film is stacked on the illuminating surface of the light guiding plate.

The frame surrounds the light guiding plate, the light source and the optical film, the light source towards the incident surface, the light source is disposed above the extending plate, and the optical film is stacked with the light guiding plate.

Wherein, the extending plate further comprises a supplementary light surface, the supplementary light surface is perpendicular to the incident surface, or an acute angle is inscribed by the supplementary light surface and the incident surface.

Wherein, the light source comprises a fixed portion and an illuminating portion, the illuminating portion is fixed at the fixed portion, and the illuminating portion is located at the side of the incident surface of the light guiding plate and is disposed above the supplementary light surface.

Wherein, a bottom surface of the extending plate and the bottom surface of the main body are disposed stepwisely, such that a concave portion is formed on the bottom surface of the main body, the backlight module further comprises a reflective plate, and the reflective plate is disposed inside the concave portion.

Wherein, the backplate comprises a bottom plate and a lateral plate, the lateral plate surrounds the bottom plate, the frame is disposed on the bottom plate along the lateral plate, the light guiding plate is assembled on the bottom plate, the end of the extending plate away from the incident surface abuts the frame, and the reflective plate is packaged inside the concave portion by the bottom plate.

The disclosure also provides a display device. The display device comprise the backlight module described above and a display panel. The display panel covers the backlight module and is fixed with the backplate.

Wherein, the display panel is fixed with the peripheral edge of the optical film and the backplate by double sided adhesive.

According to the disclosure, an extending plate is disposed at the side of the incident surface of the light guiding plate of the backlight module, a light source is disposed between the extending plate and the incident surface, the light of the leaked part of the light source passes through the extending plate and enters the light guiding plate, such that the light source is sufficiently used, the waste of the light source is avoided, and the utilization percentage of the light source is increased.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
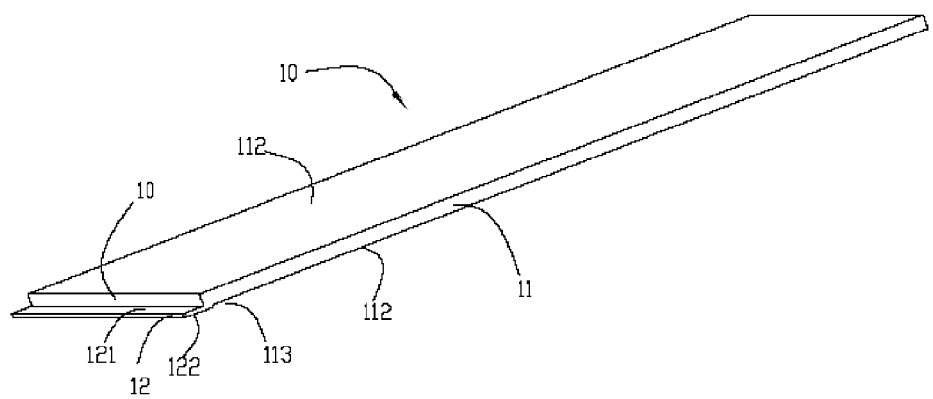
FIG. 1 is a schematic view of the light guiding plate according to the embodiment the disclosure.

Referring to FIG. 1, according to a preferred embodiment, a light guiding plate 10, a backlight module having the light guiding plate 10 and a display device are provided. The display device comprises a backlight module and a display panel 30. The display panel covers the backlight module and is fixed with the backplate of the backlight module. The light guiding plate is configured for adjusting and illuminating the light of the backlight module.

In this embodiment, the light guiding plate 10 comprises a main body 11 and an extending plate 12. The main body 11 comprises an incident surface 111, an illuminating surface 112 adjacent with the incident surface 111, and a bottom surface 113 opposite to the illuminating surface 112. The extending plate 12 extends from the incident surface 111 toward the direction away from the main body 11.

In this embodiment, the main body 11 is a rectangular plate. The extending plate 12 is a stripe plate at one side of the light guiding plate, and the extending plate 12 and the light guiding plate 10 are integrally formed. The extending plate comprises a supplementary light surface 121. The supplementary light surface 121 is perpendicular to the incident surface 111, or an acute angle is inscribed by the supplementary light surface 121 and the incident surface 111. In this embodiment, the supplementary light surface 121 of the extending plate 12 is perpendicular to the incident surface 111, i.e. the extending plate 12 is perpendicular to the incident surface 111. In some other embodiments, an acute angle is inscribed by the supplementary light surface 121 and the incident surface 111.

In this embodiment, the extending plate 12 further comprises a bottom surface 122 opposite to the supplementary light surface 121. The bottom surface 122 of the extending plate 12 and the bottom surface 112 of the main body 11 toward the same direction. The bottom surface 122 of the extending plate 12 and the bottom surface 112 of the main body 11 are disposed stepwisely, such that a concave portion 113 is formed on the bottom of the light guiding plate 10. The height of the bottom surface 122 of the extending plate 12 is higher than the height of the bottom surface 112 of the main body 11. The concave portion 113 is formed on the bottom surface 112 of the main body 11.

Figure 2:
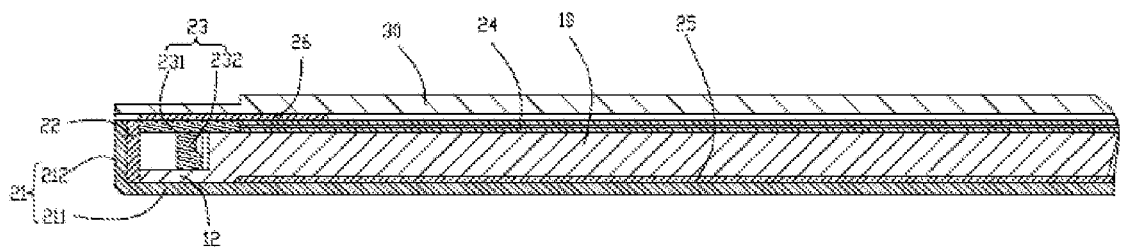
FIG. 2 is a sectional view of the display device having the backlight module according to the embodiment the disclosure.

Referring to FIG. 2, in this embodiment, the backlight module comprises a backplate 21, a frame 22, a light source 23 and an optical film 24. The frame 22, the light guiding plate 10, the light source 23 and the optical film 24 are disposed inside the backplate 21, and the optical film 24 is stacked on the illuminating surface 112 of the light guiding plate 10. The frame 22 surrounds the light guiding plate 10, the light source 23 and the optical film 24, the light source 23 towards the incident surface 112, the light source 23 is disposed above the supplementary light surface 121 of the extending plate 12, and the optical film 24 is stacked with the light guiding plate 10.

In this embodiment, the backplate 21 comprises a bottom plate 211 and a lateral plate 212 surrounding the bottom plate 211. The bottom plate 211 and the lateral plate 212 form an accommodating space, configured for accommodating the frame 22, the light guiding plate 10, the light source 23 and the optical film 24. The light guiding plate 10 is stacked with the bottom plate 211. A reflective plate 211 is disposed between the backplate 21 and the light guiding plate 10. In this embodiment, the end of the extending plate 12 away from the incident surface abuts the frame 22, such that it does not occupy the space of the backlight module along the vertical axis, and the reflective plate 25 is packaged inside the concave portion by the bottom plate. As compared with present technique, the light guiding plate is stacked with the illuminating plate. In the disclosure, the reflective plate 25 is packaged inside the concave portion by the bottom plate, such that the total thickness of the backlight module is decreased.

In this embodiment, the light source 23 is disposed between the incident surface 111 of the light guiding plate 10 and the frame 22. The light source 23 comprises a fixed portion 231 and an illuminating portion 232. The illuminating portion 232 is fixed at the fixed portion 231. The illuminating portion 232 is located at the side of the incident surface 111 of the light guiding plate 10 and is disposed above the supplementary light surface 121.

In this embodiment, the supplementary light surface 121 of the extending plate 12 is perpendicular to the incident surface 111. When the illuminating portion 232 of the light source 23 emits light, most of the light passes through the incident surface and enters the light guiding plate 10, the light is guided and emitted from the illuminating surface 112, i.e. it provides a light source for the backlight module; meanwhile, a small part of light is leaked from the bottom of the illuminating portion 232, i.e. the side of the bottom plate toward the backplate, this part of light would pass through the supplementary light surface 121 of the extending plate 12 and enter the light guiding plate 10. After being refracted inside the light guiding plate 10, the light is emitted from the illuminating surface 112. Thus, the waste of light can be decreased, and the utilization percentage of the light source 23 is increased. In some other embodiments, an acute angle is inscribed by the supplementary light surface 121 and the incident surface 111, i.e. the supplementary light surface 121 inclines toward the incident surface 111; the light leaked from the bottom of the illuminating portion 232 passes through the supplementary light surface 121 of the extending plate 12 and enters the light guiding plate 10, the leakage of light at the side opposite to the incident surface 111 would also incline toward the illuminating portion as well because the supplementary light surface 121 inclines toward the incident surface 111, such that the light leaked from the side opposite to the incident surface 111 can be guided to the light guiding plate 10.

In this embodiment, the optical film 24 can be different types of stacking structures, such as a diffusion film, a prism film, a polarizing film and so forth. The optical film 24 is fixed to the light source 23 and the lateral plate 212 by double sided adhesive 26. The double sided adhesive 26 is sticked to the peripheral edge of the optical film 24 and the end surface of the lateral plate 212, such that the optical film 24 is fixed to the backplate 24.

In this embodiment, the display panel covers the backlight module, and the display panel is fixed with the peripheral edge of the optical film and the backplate by double sided adhesive.

According to the disclosure, an extending plate is disposed at the side of the incident surface of the light guiding plate of the backlight module, a light source is disposed between the extending plate and the incident surface, the light of the leaked part of the light source passes through the extending plate and enters the light guiding plate, such that the light source is sufficiently used, the waste of the light source is avoided, and the utilization percentage of the light source is increased.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A light guiding plate, comprising:
   a main body, comprising:
   an incident surface;
   an illuminating surface, adjacent with the incident surface; and
   a bottom surface, opposite to the illuminating surface; and
   an extending plate, extending from the incident surface toward the direction away from the main body;
   wherein the extending plate further comprises a supplementary light surface and a bottom surface opposite to the supplementary light surface, the bottom surface of the extending plate and the bottom surface of the main body toward the same direction, the bottom surface of the extending plate and the bottom surface of the main body are disposed stepwisely, such that a concave portion is formed on the bottom of the light guiding plate.

2. The light guiding plate according to claim 1, wherein the supplementary light surface is perpendicular to the incident surface, or an acute angle is inscribed by the supplementary light surface and the incident surface.

3. A backlight module, comprising:
   a backplate;
   a frame;
   a light source;
   an optical film;
   a reflective plate; and
   a light guiding plate, comprising:
   a main body, comprising:
   an incident surface;
   an illuminating surface, adjacent with the incident surface; and
   a bottom surface, opposite to the illuminating surface; and
   an extending plate, extending from the incident surface toward the direction away from the main body;
   wherein a bottom surface of the extending plate and the bottom surface of the main body are disposed stepwisely, such that a concave portion is formed on the bottom surface of the main body;
   wherein the frame, the light guiding plate, the light source and the optical film are disposed inside the backplate, and the optical film is stacked on the illuminating surface of the light guiding plate;
   wherein the frame surrounds the light guiding plate, the light source and the optical film, the light source towards the incident surface, the light source is disposed above the extending plate, and the optical film is stacked with the light guiding plate.

4. The backlight module according to claim 3, wherein the extending plate further comprises a supplementary light surface, the supplementary light surface is perpendicular to the incident surface, or an acute angle is inscribed by the supplementary light surface and the incident surface.

5. The backlight module according to claim 4, wherein the light source comprises a fixed portion and an illuminating portion, the illuminating portion is fixed at the fixed portion, and the illuminating portion is located at the side of the incident surface of the light guiding plate and is disposed above the supplementary light surface.

6. The backlight module according to claim 3, wherein the backplate comprises a bottom plate and a lateral plate, the lateral plate surrounds the bottom plate, the frame is disposed on the bottom plate along the lateral plate, the light guiding plate is assembled on the bottom plate, the end of the extending plate away from the incident surface abuts the frame, and the reflective plate is packaged inside the concave portion by the bottom plate.

7. A display device, comprising
   a backlight module, comprising:
   a backplate;
   a frame;
   a light source;
   an optical film;
   a reflective plate; and
   a light guiding plate, comprising:
   a main body, comprising:
   an incident surface;
   an illuminating surface, adjacent with the incident surface; and
   a bottom surface, opposite to the illuminating surface; and
   an extending plate, extending from the incident surface toward the direction away from the main body;
   wherein a bottom surface of the extending plate and the bottom surface of the main body are disposed stepwisely, such that a concave portion is formed on the bottom surface of the main body;
   wherein the frame, the light guiding plate, the light source and the optical film are disposed inside the backplate, and the optical film is stacked on the illuminating surface of the light guiding plate;
   wherein the frame surrounds the light guiding plate, the light source and the optical film, the light source towards the incident surface, the light source is disposed above the extending plate, and the optical film is stacked with the light guiding plate; and
   a display panel, covering the backlight module, and being fixed with the backplate.

8. The display device according to claim 7, wherein the extending plate further comprises a supplementary light surface, the supplementary light surface is perpendicular to the incident surface, or an acute angle is inscribed by the supplementary light surface and the incident surface.

9. The display device according to claim 8, wherein the light source comprises a fixed portion and an illuminating portion, the illuminating portion is fixed at the fixed portion, and the illuminating portion is located at the side of the incident surface of the light guiding plate and is disposed above the supplementary light surface.

10. The display device according to claim 7, wherein the backplate comprises a bottom plate and a lateral plate, the lateral plate surrounds the bottom plate, the frame is disposed on the bottom plate along the lateral plate, the light guiding plate is assembled on the bottom plate, the end of the extending plate away from the incident surface abuts the frame, and the reflective plate is packaged inside the concave portion by the bottom plate.

11. The display device according to claim 7, wherein the display panel is fixed with a peripheral edge of the optical film and the backplate by double sided adhesive.

* * * * *

UNITED STATES PATENT AND TRADEMARK OFFICE
CERTIFICATE OF CORRECTION

PATENT NO. : 9,703,034 B2  
APPLICATION NO. : 14/758231  
DATED : July 11, 2017  
INVENTOR(S) : Yanxue Zhang Page 1 of 1

It is certified that error appears in the above-identified patent and that said Letters Patent is hereby corrected as shown below:

On the Title Page

(73) Assignee should read: "Wuhan China Star Optoelectronics Technology Co., Ltd; Wuhan, Hubei, China"

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*